Patented Jan. 26, 1937

2,069,187

UNITED STATES PATENT OFFICE 2,069,187

PROCESS OF CONVERTING SOY-BEAN OIL, AND OF OBTAINING LECITHIN

Henry R. Kraybill, La Fayette, Ind., assignor to Purdue Research Foundation, West Lafayette, Ind., a corporation of Indiana No Drawing. Application December 22, 1932, Serial No. 648,448

10 Claims. (Cl. 87—6)

It is the object of my invention to obtain a "non-break" soy-bean oil from the commercial "break" soy-bean oil; and at the same time to obtain phosphatides, including lecithin in a somewhat crude form, as a by-product.

For many purposes, especially for the manufacture of paints and varnishes, a "non-break" soy-bean oil is desired. A "non-break" soy-bean oil is one which when heated to a temperature of approximately 315° C. shows little or no precipitate and becomes lighter in color, and desirably bleaches to a colorless or very pale yellow oil. A "break" oil is one which when heated to such temperature of 315° C. develops a dark color and a dark-colored precipitate.

The test of heating the oil to a temperature of 315° C., to determine what change in color occurs, if any, and whether or not a precipitate forms, is called the "break test". The color may conveniently be determined and described by comparison with a series of solutions of varying amounts of iodine in 10% potassium iodide solution, measured in milligrams of iodine per 100 cc. of the solution; and that method of determining and describing it is the one I have used here, although any other available method may be used.

The present commercial soy-bean oil is ordinarily produced by expression from the soy beans at a high temperature, in the neighborhood of and usually somewhat above 100° C. This high temperature of expression is used in order to obtain a high yield of the oil. But at that high expression-temperature which is thus commercially used, the expressed oil is a "break" oil.

I have discovered that the substances which cause the breaking of this commercial soy-bean oil obtained by expression at high temperature are crude phosphatides, including lecithin, which are present in the oil when it is so obtained; and that if these phosphatides are removed from the "break" oil, I can obtain the more valuable "non-break" oil; and that I can obtain the crude phosphatides as a by-product, which includes lecithin and has considerable value.

Various methods may be used to remove the crude phosphatides from the "break" soy-bean oil containing it. I give below two methods as examples.

Method A

A quantity, say half a liter if the method is practiced on a small scale, of the "break" soy-bean oil which it is desired to convert into a "non-break" oil is refluxed for an hour with 95% alcohol, preferably ethyl alcohol. The mixture containing the oil and the alcohol is allowed to stand over night in the refrigerator. The oil is substantially insoluble in cold alcohol, and so on this cooling the alcohol comes to the top and can readily be decanted off. The extraction of the oil with alcohol may be repeated, two or three times if desired, with each extraction followed by cooling and decanting as in the first instance.

After a single extraction the oil is a good non-break oil; and it becomes increasingly non-break, or lighter in color after being submitted to the break test, with repeated extractions.

The alcohol extract, or the combined alcohol extract if there is more than one extraction, contains the crude phosphatides. These phosphatides may be removed from the alcohol by evaporation, preferably at low temperature and under vacuum. An oily viscous mass remains after such evaporation. This may be taken up in ether, and the ether evaporated off. The resultant substance is a good grade of practically sugar-free phosphatides; and contains lecithin in varying amounts, depending on the oil used as the starting material.

Method B

A quantity, say a liter if the method is carried out on a small scale, of the "break" soy-bean oil which it is desired to convert into a non-break oil, is well emulsified with water, as in a deflocculator. The amount of water may vary over a wide range, for I have gotten results with the water as low as one-fortieth volume (here 25 cc.) and as high as two volumes (here two liters). I prefer about one-thirtieth to one-tenth volume of water (here 33 cc. to 100 cc.). The emulsification usually requires about five to fifteen minutes. Then a separation is obtained of a substantially phosphatide-free oil from a smaller amount of emulsion of water and the phosphatides with some of the oil. This separation may be obtained in any one of a plurality of ways, as by centrifuging or filtering.

In the centrifugal separation, the emulsion is centrifuged at high speed, up to about 30,000 and 35,000 R. P. M., to separate out a soft thick mass, which resembles butter in texture. This mass collects in the centrifuge bowl. The centrifuging of the emulsion of oil and water is repeated until no more of the soft mass is so collected. The oil which remains after this centrifuging is found to be a good "non-break" oil. In the separation by filtration, the emulsion is simply filtered, as through filter paper if on a small scale or in a filter press if on a large scale; which leaves a similar butter-like residue and gives a filtrate which is a good "non-break" oil.

The soft butter-like mass, obtained as the residue either by centrifuging or filtering, is itself a heavy emulsion; which contains the crude phosphatides, the water, and some oil. The water is now suitably removed. This may be by simple evaporation under vacuum at low temperature. Or it may be by treating the heavy emulsion with alcohol so that the alcohol takes up the water; after which the alcohol and water are evaporated off together, desirably at low temperature and under vacuum. The residue is a good grade of crude but substantially sugar-free phosphatides, or crude lecithin, and contains lecithin in varying amounts.

The original "break" soy-bean oil ordinarily contains phosphorus equivalent to lecithin of between 0.9% to 1.5%. The final "non-break" oil which I obtain contains much less phosphorus, equivalent to lecithin of less than 0.5%, and sometimes as low as 0.1%.

The final crude phosphatides which I obtain are rich in lecithin, for usually they contain phosphorus equivalent to between 30% and 50% of lecithin. This is a good commercial crude lecithin product. It may be further purified, if desired, by known methods of purifying lecithin.

I claim as my invention:

1. The method of converting an expressed "break" soy-bean oil into a "non-break" soy-bean oil, and at the same time obtaining phosphatides therefrom, which consists in separating phosphatides as such from such expressed "break" soy-bean oil by extracting the "break" soy-bean oil with water or alcohol which in the cold does not materially dissolve the oil but does hold phosphatides, and separating said water or alcohol and the phosphatides which it holds from the resultant "non-break" oil.

2. The method of obtaining a "non-break" soy-bean oil, and at the same time obtaining phosphatides, which consists in expressing oil from soy beans under conditions which produce a "break" soy-bean oil, and then separating phosphatides as such from such "break" soy-bean oil to produce a "non-break" soy-bean oil by extracting the "break" soy-bean oil with water or alcohol which in the cold does not materially dissolve the oil but does hold phosphatides, and separating said water or alcohol and the phosphatides which it holds from the resultant "non-break" oil.

3. The method of converting an expressed "break" soy-bean oil into a "non-break" soy-bean oil, which consists in extracting such expressed "break" soy-bean oil with alcohol to remove phosphatides therefrom to produce a "non-break" soy-bean oil.

4. The method of converting an expressed "break" soy-bean oil into a "non-break" soy-bean oil, which consists in forming an emulsion of such expressed "break" soy-bean oil with water, and then centrifuging the emulsion to obtain a "non-break" soy-bean oil.

5. The method of converting an expressed "break" soy-bean oil into a "non-break" soy-bean oil, which consists in forming an emulsion of such expressed "break" soy-bean oil with water, and then filtering the emulsion to obtain a "non-break" soy-bean oil.

6. The method of converting an expressed "break" soy-bean oil into a "non-break" soy-bean oil, which consists in forming an emulsion of such expressed "break" soy-bean oil with water, and then separating the emulsion into two parts, one of which contains the larger part of the soy-bean oil as a "non-break" soy-bean oil and the other of which contains phosphatides and water and some of the soy-bean oil.

7. The method of producing crude lecithin, which consists in expressing oil from soy beans under conditions which produce a "break" soy-bean oil, and then separating the crude lecithin as such from such "break" soy-bean oil by extracting the "break" soy-bean oil with water or alcohol which in the cold does not materially dissolve the oil but does hold lecithin, and separating said water or alcohol and the lecithin which it holds from the resultant "non-break" oil.

8. The method of producing crude lecithin, which consists in extracting it with alcohol from an expressed "break" soy-bean oil, and evaporating the alcohol from the extract so obtained.

9. The method of producing crude lecithin, which consists in forming an emulsion of expressed "break" soy-bean oil with water, and centrifuging the emulsion to obtain crude lecithin therefrom.

10. The method of producing crude lecithin, which consists in forming an emulsion of expressed "break" soy-bean oil with water, and filtering the emulsion to obtain crude lecithin therefrom.

HENRY R. KRAYBILL.